3,039,752
CONTACTING APPARATUS FOR RECTIFYING
AND CONTACTING COLUMNS
Walter Kittel, Gmunden, Austria
Augusta-Anlage 38/C-410, (Mannheim, Germany)
Filed Mar. 18, 1958, Ser. No. 722,353
Claims priority, application Switzerland Mar. 7, 1952
4 Claims. (Cl. 261—148)

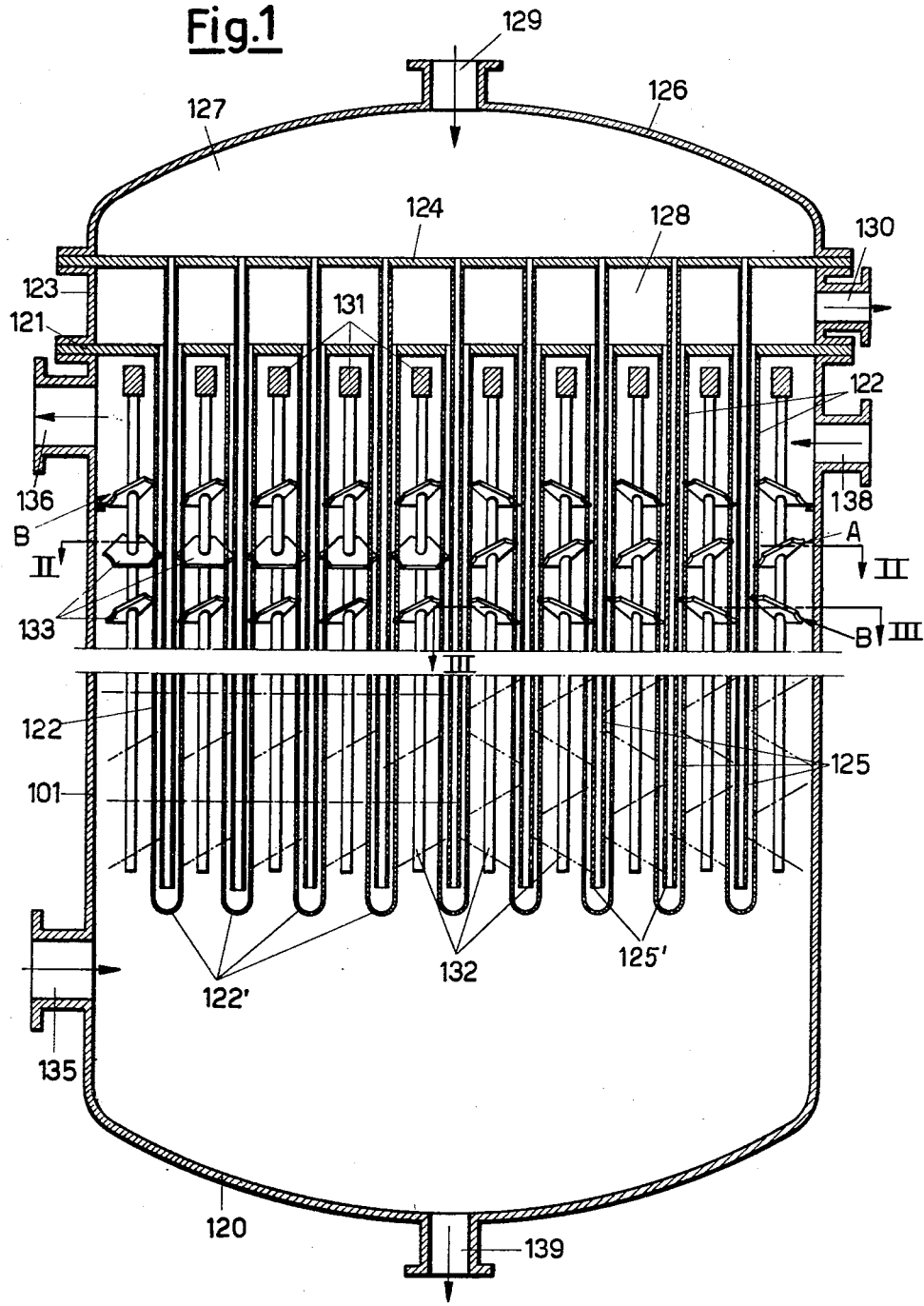

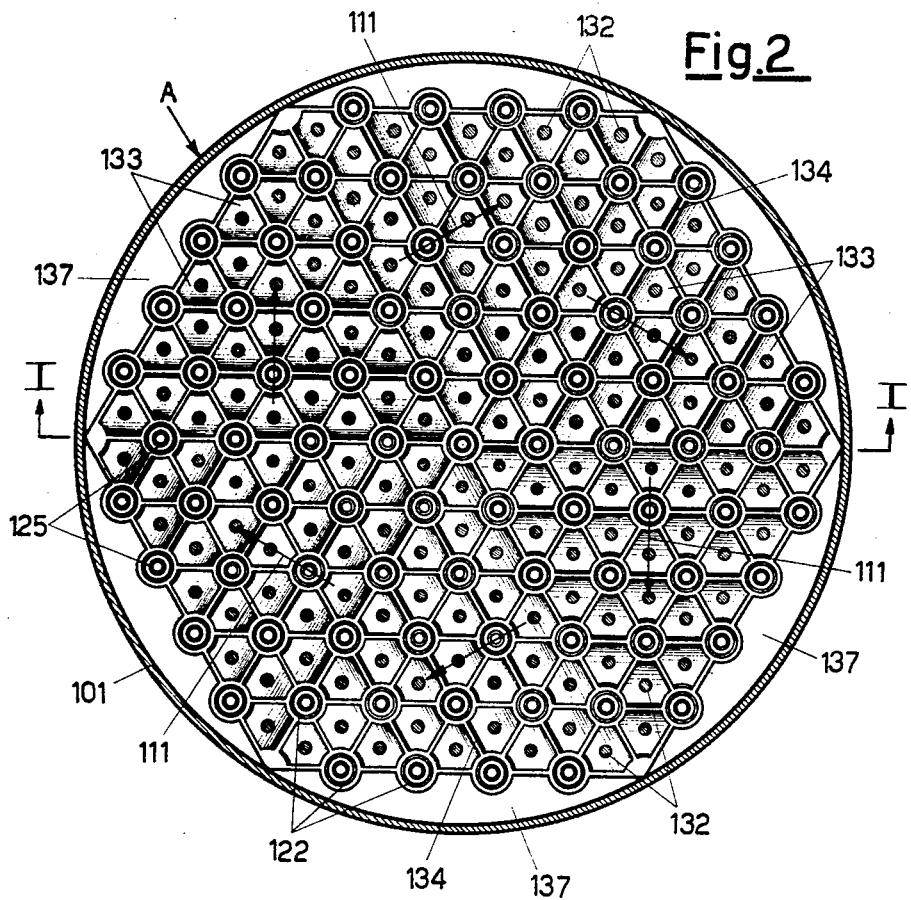

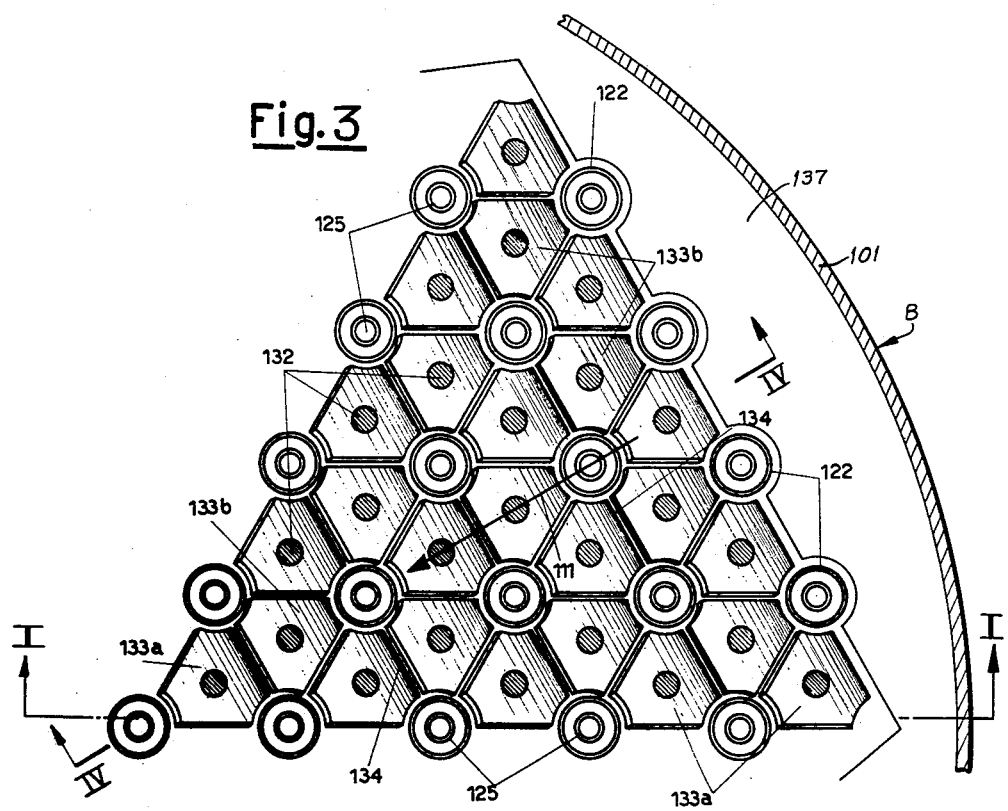
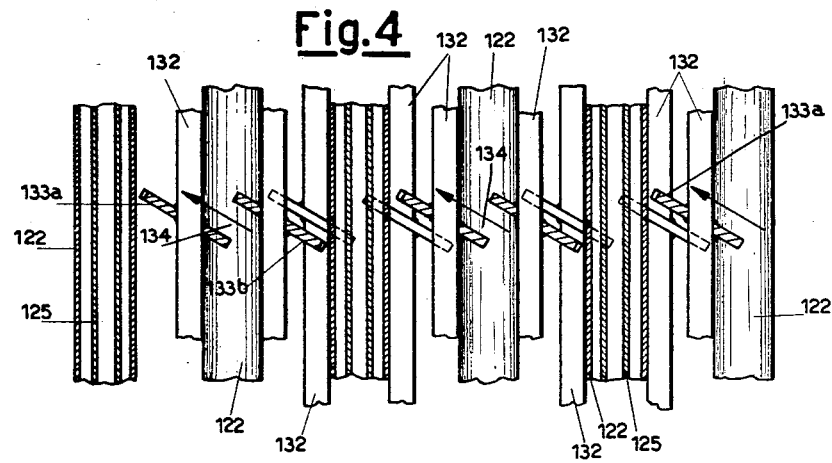

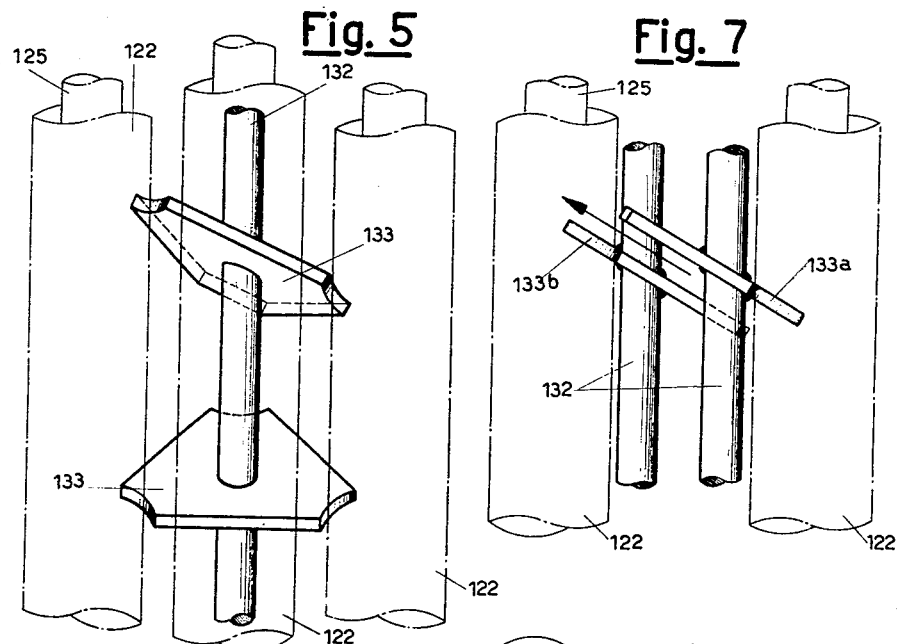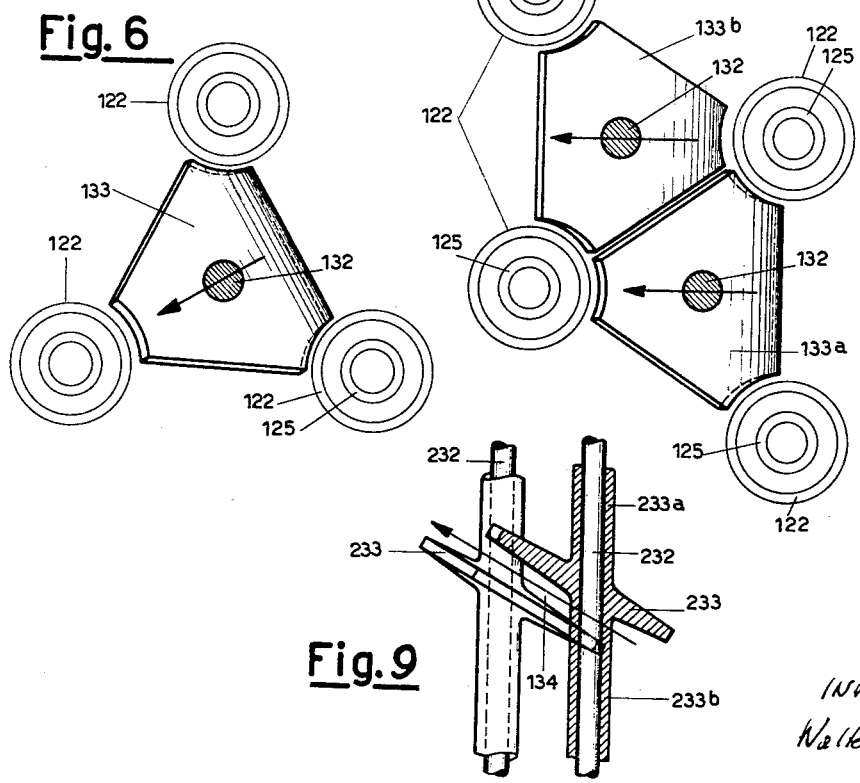

The invention relates to a contacting apparatus for rectifying and contacting columns in which liquid and gaseous or vaporous media are led in counter-current with respect to one another in order to bring them into intimate mutual contact.

This application is a continuation-in-part of my co-pending U.S. application Serial Number 340,584, filed March 5, 1953, and now abandoned.

Such contact apparatus is described for instance in my U.S. patent specification No. 2,568,749 and consists according to that earlier patent essentially of circular plates assembled horizontally in the cylindrical column, which are subdivided each into a certain number of sectors. In each sector there are provided a plurality of slots for gaseous flow, which lead from one surface of the sector plate to the other surface of the same plate, said slots being provided in parallel rows and their outlet apertures in each sector being inclined towards the plane of the plate in the same direction. The gas outlet apertures of the slots in the various sector plates on the contrary are inclined in different directions.

By that arrangement I have attained the purpose of having the liquid on each plate surface receive—by effect of the gases or vapors rising and passing through said flow slots in the corresponding direction—a movement of rotation about the vertical axis of the column, which may possess a prevailing centrifugal or centripetal component in accordance with the way in which the gas flow slots are directed. In the column there are assembled alternately plates whose flow slots are directed so as to make a centrifugal component prevail, and plates whose flow slots make a centripetal component prevail of the rotary movement of the liquid.

The various and numerous advantages in operation which are involved by the creation of such rotational flows of the liquid on the individual plates assembled in the column are already set forth in my said earlier patent. I wish to emphasize that by the rotation a completely uniform distribution of liquid over the whole plate surface is obtained, while on the other hand the exchange effect between the liquid on one side and the gases or vapors on the other side is substantially improved, and the formation of channels and dead zones as well as of deposits is completely avoided. Thereby the possibility is afforded of having suspended solid substances take part with the process in question. Moreover, a more intense and uniform heat input and removal are attained as a consequence of the higher rotational flow velocity and more uniform distribution. With the aid of said rotary flows, therefore, if the latter are controlled rationally, all requirements can be met which arise in the practice of many physical processes and chemical reactions.

Now it is an object of the present invention mainly to provide a contacting apparatus for rectifying and contacting columns which meets the above described functional requirements and characteristics, but affords unlimited possibility of extension also with columns having a large diameter as well as affording simplicity of assembling, disassembling and inspecting operations.

It is a further object of the invention to provide such a subdivision of the individual plates to be assembled in the column, as to afford on the one hand still a sufficiently differentiated influence upon the state of flow of the liquid on the whole plate surface as due to the gases or vapors passed through the flow slots of the plate, and on the other hand the most advantageous and simplest solution of the problems of manufacture and assembling.

It is a further object of the invention to subdivide the whole plate surface—while keeping the possibility of attaining the desired state of flow—into a plurality of individual prefabricated elements completely equal to one another, said individual elements having to be supported and fixed in the column individually so as to enable one to mount or remove them individually at will.

Moreover, it is an object of the invention to afford the possibility of a uniform heat supply and removal over the whole surface of the plates assembled in the column, again while keeping rotational flows of the liquid on the plates, as is required specially with numerous chemical reactions, for instance with the Fischer-Tropsch synthesis using a contact mass suspended in the gas.

It is an essential feature of the invention that each of the plates assembled in the column is subdivided into six sector-shaped zones, those sectors possessing each a vertex-angle of 60°. Each of those sector-shaped zones in turn is subdivided into a plurality of individual plate-shaped elements. In the column there are provided parallel to the column axis and distributed symmetrically with respect to said axis, rods or pipes or the like which serve to support individually and separately each of said individual elements in the shape of equilateral triangles, there being provided suitable means for fastening each of those elements to at least one of said rods or pipes at suitable height. If all of the individual elements are applied to the supporting members, they form within the column a plurality of substantially horizontal surfaces, said surfaces being broken by passageways permitting flow of the gases or vapors from the bottom face to the top face. The outlet apertures of said passageways or flow slots are inclined in each sector zone in equal direction with respect to the horizontal plane, while the outlet apertures of the flow slots in the various sector zones are inclined in different directions.

The subdivision, according to the present invention, of the plates assembled in the column into six sectors of equal size and the further subdivision of said sectors into a number of substantially equilateral triangular plate elements, involves not only the above-mentioned advantages in assembling and manufacturing, but also has proved to be particularly advantageous as to the desired effect of causing rotational flows. As already mentioned above in my earlier U.S.A. patent specification No. 2,568,749, a subdivision of the plates into sector-shaped zones was proposed, that is, it had already been recognized that to attain the rotational flow it was not absolutely indispensable to arrange the gas flow slots in the plate in completely regular distribution around the center, but that it suffices to arrange the flow slots in the individual zones parallel seriatim, so that the gases or vapors passing through the slots leave in the same sense of rotation and act upon the liquid in the same direction. On the other hand, it is apparent that with a division of the plates into only a few sector-shaped zones, as for instance into three or four zones, it is no longer possible to cause the state of flow to be influenced in so differentiated a manner. However, since such differentiated state of flow is required in the majority of cases, the exchange effect becomes seriously prejudiced.

It has been found, according to the invention, that the proposed division into six sectors affords sufficient "fineness" to enable influencing of the state of flow through the plate in the desired way, and that this division in the manner hereinbefore set forth is particularly suited for further subdivision into equilateral triangular elements.

Hence, as has been found in practice, this is the most favorable solution of compromise between the requirements of manufacture and assembling, in particular for columns of great diameter.

Also with the plates composed according to the invention of triangular individual elements and assembled in a column, the liquid led in countercurrent to the rising gases or vapors is made to drip, in a manner known per se, through the flow slots for said gases or vapors. With plates whose flow slots are so directed that the rotary movement of the liquid possesses a prevailingly centrifugal component, the liquid is automatically brought to the plate border and there drips through said flow slots.

On the contrary, with the subsequent plate, there prevails a centripetal component of rotational flow, and the liquid drips through said flow slots at the middle zone.

According to a feature of the invention, the individual equilateral triangular elements are arranged somewhat inclined with respect to the horizontal plane, so that between contiguous elements there are formed flow slots or passageways for the rising gases or vapors.

Through this embodiment the gases or vapors are no longer passed and directed through slots, vapors are passed between adjacent elements and obtain thereby a well-determined direction according to the inclination of the elements. The effect is that the liquid which finds itself on the surface formed by the whole of the elements lying approximately in one horizontal plane is put to rotation by the gases or vapors flowing upwards between the elements, whereby there may prevail a centrifugal or a centripetal components of flow. Each element is fastened preferably at its center to a vertical supporting member. These elements are assembled in sector-shaped zones, one surface being subdivided into six sectors and the elements of each sector possessing equal inclination and direction.

This solution is particularly convenient if the problem is to supply or to remove heat to or from the media led in countercurrent, in addition to producing the effect of flow described above and the intimate contact thereby involved. Owing to the small size of the individual triangular elements, it is possible to arrange the heating or cooling pipes for heat supply or removal in convenient proximity to one another, so that perfectly uniform conditions are attained over the whole surface of the contact apparatus assembled within the column.

Further objects and features of the invention are set forth more in detail hereinafter with reference to the drawings, in which there are represented various embodiments.

FIG. 1 is a longitudinal vertical section, taken along line I—I of FIG. 2 (and partly along line I—I of FIG. 3), of an apparatus according to the invention wherein there are provided individual elements inclined towards the horizontal plane;

FIG. 2 is a longitudinal cross section of the apparatus taken along line II—II of FIG. 1;

FIG. 3 is a section similar to FIG. 2, but taken along line III—III of FIG. 1 on an enlarged scale;

FIG. 4 is a vertical section taken along line IV—IV of FIG. 3;

FIGS. 5 and 6 show in an elevational front view and in a plan view, respectively, two inclined individual elements arranged above one another;

FIGS. 7 and 8 show in two views similar to FIGS. 5 and 6 two inclined individual elements arranged side by side; and FIG. 9 is a vertical section analogous to that of FIG. 4 wherein there are represented individual elements formed of ceramic pieces and arranged in three superimposed horizontal planes.

The drawings illustrate the invention only schematically, without going into constructive details in particular.

In FIGS. 1 and 2 there is shown in a respective longitudinal section and a cross-section a reactor such as may be employed for carrying out the most varied exothermal and endothermal chemical reactions, but also equally well with more physical processes involving heat supply or heat removal, such as for instance condensation or the like.

The reactor has a substantially cylindrical wall 101 which at its bottom blends in to form a closed base 120. The upper closure is formed by a plate or board 121 to which there are fastened a plurality of pipes 122 projecting vertically downwards. As clearly visible in FIG. 2, the pipes 122 are arranged in uniform distribution around the central axis and represent in plan the vertices of equilateral triangles. The lower ends 122' of the pipes 122 are closed.

Above the board or plate 121 there is provided—with interposition of a U-shaped profile annular ring 123—a further board or plate 124 to which there are also fastened a plurality of pipes 125 projecting vertically downwards. The number of pipes 125 is equal to the number of pipes 122 and the former project concentrically into the latter. The open lower ends 125' of the pipes 125 are somewhat above the closed ends 122' of the pipes 122.

The reactor is closed at its top by a lid 126. The arrangement is such that the interiors of the pipes 125 are in communication, through convenient bores in a board or plate 124, with the space 127 which is confined by the board 124 and by the lid 126. The interspace between the pipes 122 and 125, on the other hand, is in communication, through convenient bores in the board 121, with a space 128 which is confined by the boards 121 and 124 and by the ring 123.

In the lid 126 there is provided an inlet aperture 129 while the profile annular ring 123 is provided with an outlet aperture 130. To those apertures 129 and 130 there are connected pipes not shown—for the feeding or discharging of a heating or cooling medium, which thus flows from the space 127 into the pipes 125, and then flows through the interspaces between the pipes 122 and 125 into the space 128, from which the medium flows off through the outlet 130. The external pipes 122 in this case provide proper heat transfer.

To a supporting structure provided below the board 121, and consisting of cross-beams 131, there are fastened rods 132 projecting vertically downwards. These rods 132 are arranged in such distribution as to represent in plan the center of the equilateral triangles formed between the pipes 122. To the rods 132 there are fixed in vertical succession small and substantially equilateral triangular plate elements 133, the corners of which are each inwardly rounded so that each element fits accurately between three pipes 122 (see FIGS. 2 and 3).

When assembled, the plate elements 133 form, in the interior of the cylinder wall 101, a vertical series of superimposed, substantially horizontal and closed individual plates, as shown in FIG. 1. Each plate is subdivided into six sector-shaped zones around the central vertical axis of the contacting apparatus (as best seen in FIG. 2, with FIG. 3 showing one of these sectors alone). The plate elements 133 are not fastened to the rods 132 in a manner that would make the axes of the rods normal to the surfaces of the elements 133, but they are rather fastened at a predetermined inclination with respect to the horizontal. As a consequence, the plates 133 arranged at equal height do not lie in one horizontal plane, but are inclined with respect to this imaginary horizontal plane which passes through the fastening points of the plates 133 at the rods 132. A consequence thereof is that there are provided between the plate elements 133 free passageways or apertures 134 which are directional in accordance with the inclination and direction of the plate elements 133 (see in particular FIGS. 3 and 4).

The arrangement is made such that every plate (tray of the column) is subdivided into six sector zones of equal size, the plate elements 133 of each sector possessing equal inclination and direction, so that the flow slots (passageways or apertures) 134 within each sector are also directional in the same direction. The arrows 111 (FIGS. 2 and 3) indicate the corresponding direction of flow (passage) for each sector. In adjacent sectors said directions of flow or passage are, respectively, rotated by 60° with respect to each other. With the arrangement according to FIG. 2 there is formed a plate (column tray) A with a preferred centrifugal direction of flow of the gases or vapors through the apertures 134 and the liquid is thus put into rotation on such a plate A. As shown in FIG. 1, a plate A according to FIG. 2 is followed within the column by a plate B wherein the arrangement, i.e., the inclination and directionality of the elements 133 is selected in such a way that the direction of flow through the apertures between the elements is centripetal for each sector. FIG. 3 shows a sector portion of plates B in a partial sectional view otherwise similar to that of FIG. 2 where the plates A are shown. Owing to the enlarged scale, FIG. 3 shows about one-sixth of a plate B where the flow of the gases or vapors is centripetal, as shown by the arrow 111 directed towards the vertical axis of the reactor column.

In the enlarged detail representations of FIGS. 3-8, the shape and inclined arrangement of the individual plate elements 133 is shown very clearly. In particular, from these representations it is indicated that part of the elements 133 (those which are designated 133a in FIGS. 3, 4, 7 and 8) are directed with their vertex upwards and with the opposite side edge downwards, while the other part (indicated 133b in said figures) are directed with one side edge upwards and with the opposite vertex downwards.

In FIG. 1 there is also represented an inlet channel 135 and an outlet channel 136 for the gases or vapors, while the corresponding inlet and outlet conduits for the liquid led in countercurrent to the gases or vapors are indicated as 138 and 139. As visible in FIG. 2, the border zones of each plate or tray may be formed by fixed inserts 137 in order to dispense with the necessity of having to provide in those zones individual plates of particular shape adapting to the wall 101.

Operation of the apparatus is as follows. The liquid introduced near the top at the border through the conduit 138 (there may be provided even a plurality of conduits, however) is conveyed on a plate or tray B by the gases or vapors rising between the elements 133, centripetally to the center and drips at the center through the same apertures 134 onto the subsequent plate or tray A, where it is put into rotation by the gases or vapors and drips down at the border, and so on. Simultaneously an intensive heat exchange takes place through the pipes distributed uniformly over the whole cross-section and arranged closely side by side. Through the lower conduit 139 the liquid is then discharged from the reactor.

The plate elements 133 vertically superimposed above one another are fixed to the rod 132 by welding. The fastening in the correct inclination and direction is carried out while the apparatus is disassembled, so that all that is needed to ensure proper positioning during assembly is introducing the individual rods 132, with the plate elements 133 applied thereto, into the apparatus, and fixing the rods in convenient manner to the supporting structure 131. Thus the apparatus features easiness and facility of assembling and disassembling the component elements.

According to another possible embodiment shown in FIG. 9, the plate elements are formed by ceramic profile bodies 233. The plate-shaped bodies 233 possess at both sides tubular extension 233a or 233b, the plate surfaces possessing determined inclinations towards the axes of said extensions. The coaxial extensions form internally a through bore so that it is possible to fit the entire profile body gradually over a supporting tie-rod 232. At 134, the aperture between the ceramic bodies 233 is shown, which functions in the same manner as previously described. The arrangement is similar to the example of the embodiment of FIGURE 5 described hereinbefore, but now the individual elements are not fastened to their supporting members but merely fitted over them. The tubular extensions 233a or 233b of each element so position themselves that the mutual vertical distance of the elements is automatically determined, and thus determines the vertical spacing of the plates or trays. Operation is in no way different from that already described in detail herein.

Having thus described the invention, what is claimed as new and desired to be secured by Letters Patent is:

1. In a rectifying and contacting column having a vertical cylindrical wall, having means for introducing a liquid at the top end and for discharging said liquid at the bottom end of said column, and having means for introducing gases and vapors from the bottom and for discharging said gases and vapors at the top of said column; a contacting apparatus comprising a number of superposed spaced substantially horizontal trays each occupying the entire cross-section of the column, each of said trays being subdivided into six sector-shaped zones, each of said zones having a vertex angle of substantially 60° and being in turn subdivided into a plurality of individual substantially equilateral triangular plates; a plurality of supporting members arranged parallel to the vertical axis of said column; and means for fastening each of said plates to said supporting members; said supporting members extending through all of said trays; one group of said triangular plates being fastened to said supporting members at the centers thereof, each of said triangular plates being positioned at an inclination with respect to the vertical, said inclined plates of said one group being arranged at an equal angle from said substantially horizontal trays inside said column; the plates of each of said zones having a uniform inclination and direction in such a way that between said inclined plates of said one group there are formed flow apertures for liquid and vapor passage, said apertures having uniform directions sector by sector, and alternately in one tray of said column having a prevailingly centrifugal direction and in the subsequent tray a prevailingly centripetal direction.

2. In a rectifying column, a contacting apparatus according to claim 1, wherein the corners of all of said plates of said one group are inwardly rounded to form curved notches, further comprising vertical pipes extending through said notches for circulation of a heat-exchange medium within said pipes.

3. A contacting apparatus for rectifying and contacting columns and having heat-exchange pipes for circulating within said pipes a heat-exchange medium, said pipes being arranged parallel to the longitudinal axis of said column, in symmetrical distribution with respect thereto, and so that they represent in plan the corners of equilateral triangles, the improvement comprising rod-shaped supporting members arranged parallel to said pipes so as to represent in plan view the centers of said triangles, and a plurality of plate elements of equilateral triangular shape with inwardly rounded corners, said plate elements being held by said supporting members at said centers and being inclined with respect to the axes of said supporting members, each supporting member supporting along the length thereof a plurality of said plate elements at different heights, the plate elements provided at equal heights forming respective column trays, each of said trays occupying substantially the whole column cross-section, and being subdivided into six sector zones of equal size, the plate elements of each of said zones possessing uniform inclination and direction, the inclination and direction of the plate elements in different zones being different in such a way that between said plate elements there are formed passage apertures having uniform inclination and direction in each of said zones and wherein in successive trays the passage apertures are directed prevailingly in centrifugal direction so that the gases and vapors rising there-through cause a rotary movement in the contacting liquid on the corresponding tray, while the passage apertures of the subsequent tray are directed prevailingly in centripetal direction so that said gases and vapors cause a movement towards the center of the tray in the liquid on said corresponding tray.

4. In a rectifying and contacting column having a vertical substantially cylindrical wall, having means for introducing a liquid at the top end and for discharging said liquid at the bottom end of said column, and having means for introducing gases and vapors from the bottom and for discharging said gases and vapors at the top of said column: a contacting apparatus comprising a number of superposed spaced substantially horizontal insert trays each occupying the entire cross-section of said column, each of said trays being subdivided into six sector-shaped zones, each of said zones forming a vertex angle of 60° and being in turn subdivided into a plurality of individual plate-shaped substantially equilateral triangular elements; a plurality of supporting members arranged parallel and symmetrically with respect to the vertical axis of said column; and means for fastening each of said triangular elements to said supporting members; said supporting members extending from the bottom to the top of said column for supporting all of said trays; each of said triangular elements defining a plurality of uniformly angular gas passages for uniformly angular flow of gas, said passages being inclined in each of said zones in a uniform direction with respect to the horizontal plane of said trays, and said directions of inclination in adjacent ones of all six zones being rotated by 60° with respect to one another; the direction of said passages at said triangular elements of vertically successive ones of said trays being alternately prevailingly centrifugal in one tray and prevailingly centripetal in the adjoining trays above and below said one tray.

References Cited in the file of this patent
UNITED STATES PATENTS

| | | |
|---|---|---|
| 2,568,749 | Kittel | Sept. 25, 1951 |
| 2,619,336 | Schilling | Nov. 25, 1952 |

FOREIGN PATENTS

| | | |
|---|---|---|
| 1,011,583 | France | Apr. 2, 1952 |

(Corresponding U.S.—Schilling 2,804,292)

OTHER REFERENCES

"Spiral Flow for Better Distillation," Petroleum Processing, April 1953, pages 556–559.